US012160276B2

(12) United States Patent
Keilwert

(10) Patent No.: US 12,160,276 B2
(45) Date of Patent: Dec. 3, 2024

(54) ULTRASOUND TRANSDUCERS AND RECEIVERS

(71) Applicant: IGT, Las Vegas, NV (US)

(72) Inventor: Stefan Keilwert, St. Josef (AT)

(73) Assignee: IGT, Las Vegas, NV (US)

( * ) Notice: Subject to any disclaimer, the term of this patent is extended or adjusted under 35 U.S.C. 154(b) by 57 days.

(21) Appl. No.: 17/221,101

(22) Filed: Apr. 2, 2021

(65) Prior Publication Data
US 2021/0320728 A1    Oct. 14, 2021

Related U.S. Application Data

(60) Provisional application No. 63/008,409, filed on Apr. 10, 2020.

(51) Int. Cl.
*H04B 11/00* (2006.01)
*G06F 8/65* (2018.01)
*G07F 17/32* (2006.01)

(52) U.S. Cl.
CPC ............... *H04B 11/00* (2013.01); *G06F 8/65* (2013.01); *G07F 17/3202* (2013.01); *G07F 17/3234* (2013.01); *G07F 17/3239* (2013.01)

(58) Field of Classification Search
CPC .................................. H04B 11/00; G06F 8/65
See application file for complete search history.

(56) References Cited

U.S. PATENT DOCUMENTS

| | | | |
|---|---|---|---|
| 7,670,224 B2* | 3/2010 | Williams | G07F 17/3206 463/43 |
| 8,147,334 B2 | 4/2012 | Gatto et al. | |
| 8,764,566 B2 | 7/2014 | Miltenberger et al. | |
| 9,672,689 B2* | 6/2017 | Idris | G07F 17/34 |
| 11,087,582 B2* | 8/2021 | Franich | G07F 17/3211 |
| 2002/0022508 A1* | 2/2002 | Ikariko | A63F 13/573 463/46 |
| 2007/0036368 A1* | 2/2007 | Hettinger | H03G 3/344 381/107 |
| 2008/0113749 A1* | 5/2008 | Williams | G07F 17/34 463/20 |
| 2010/0302015 A1* | 12/2010 | Kipman | A63F 13/42 340/407.1 |
| 2013/0077059 A1* | 3/2013 | Marti | G03B 21/147 353/121 |

(Continued)

FOREIGN PATENT DOCUMENTS

WO    WO-2005116801 A2 * 12/2005 ............. G06F 3/016

*Primary Examiner* — Isam A Alsomiri
*Assistant Examiner* — Joseph C Fritchman
(74) *Attorney, Agent, or Firm* — Sheridan Ross P.C.

(57) ABSTRACT

The present disclosure relates generally to utilizing ultrasonic transducers and receivers to implement directional sound in combination with gesture detection in an Electronic Gaming Machine (EGM). In one embodiment, a set of ultrasound transducers transmits positional ultrasound pulses to identify the player and/or his gesture, as well as an audio carrier signal, e.g., through a direction speaker, providing directional sound based on the feedback from the ultrasound pulses. Further, embodiments may implement air haptics in both or either of the transmitted pulses of the ultrasonic transducers and/or the audio signal from the directional speaker to provide an enhanced user experience.

20 Claims, 4 Drawing Sheets

(56) References Cited

U.S. PATENT DOCUMENTS

| | | | |
|---|---|---|---|
| 2015/0220169 A1* | 8/2015 | Keating | G06F 3/03545 |
| | | | 345/179 |
| 2016/0180636 A1* | 6/2016 | David | G07F 17/3206 |
| | | | 463/32 |
| 2018/0118161 A1* | 5/2018 | Ette | B60R 25/2054 |
| 2018/0130283 A1* | 5/2018 | Froy | G07F 17/3262 |
| 2019/0011993 A1* | 1/2019 | Ette | B60R 25/2045 |
| 2019/0227631 A1* | 7/2019 | Marti | B60K 37/06 |
| 2020/0356178 A1* | 11/2020 | Qiu | G01S 13/88 |
| 2021/0018985 A1* | 1/2021 | Verbeke | H04N 9/3179 |

* cited by examiner

100
ULTRASOUND TRANSDUCERS AND RECEIVERS

CROSS REFERENCE TO RELATED APPLICATION

The present application claims priority to U.S. Provisional Application No. 63/008,409, filed Apr. 10, 2020, the entire disclosure of which is hereby incorporated by reference.

BACKGROUND

Electronic Gaming Machines (EGMs) execute a variety of different electronic games such as slots, video poker, video roulette, etc. During execution of these games, various icon, images, graphics, animations videos, sounds, and other content are generated and presented by the EGM. EGMs often utilize multiple methods for detecting the presence and movement of a player. These may include sensors used to detect a player close to the EGM. Such sensors are typically to detect when the player has arrived at or left the machine, e.g., to transition EGM between idle and active states. There is a need in the art for improved methods and systems for controlling aspects of the EGM based on sensor input.

BRIEF SUMMARY

In certain embodiments, the present disclosure relates to an electronic gaming machine including an Electronic Gaming Machine (EGM) comprising an ultrasonic transducer producing directional, ultrasonic pulses and air haptic feedback to a predetermined location, an ultrasonic receiver positioned on the EGM to receive a return of the ultrasonic pulses from the ultrasonic transducer when a portion of a player's body is at the predetermined location, and a directional speaker producing a directional, audio signal. The EGM can further comprise a processor coupled with each of the ultrasonic transducer, the ultrasonic receiver, and the directional speaker. A memory can be coupled with and readable by the processor and store therein a set of instructions which, when executed by the processor, cause the processor to control the ultrasonic transducer to output the directional, ultrasonic pulses to the predetermined location, receive a signal from the ultrasonic receiver, and detect a movement of the player based on the received signal from the ultrasonic receiver. The instructions can further cause the processor to control the directional speaker to output sound to a location associated with the detected movement of the player and control the ultrasonic transducer or speaker to output the air haptic feedback to the location associated with the detected movement of the player.

Additional features and advantages are described herein and will be apparent from the following Description and the figures.

DETAILED DESCRIPTION

Embodiments of the present disclosure will be described in connection with a systems and methods of utilizing ultrasonic transducers and receivers to implement directional sound in combination with gesture detection in an Electronic Gaming Machine (EGM). In one embodiment, a set of ultrasound transducers transmits positional ultrasound pulses to identify the player and/or his gesture, as well as an audio carrier signal, e.g., through a direction speaker, providing directional sound based on the feedback from the ultrasound pulses. Further, embodiments may implement air haptics in both or either of the transmitted pulses of the ultrasonic transducers and/or the audio signal from the directional speaker to provide an enhanced user experience.

According to one embodiment, an EGM can include a plurality of transducers and receivers used by the EGM to track player movement and gestures and output directional sound and air haptic feedback based on feedback from the player gesture detection. The transducers can produce ultrasonic pulses, and ultrasound receivers can detect reflections to determine player gestures and movement. The transducers and receivers can detect the gesture and movement information and the EGM can determine audio output and air haptic feedback direction based thereon. In some embodiments, the transducers and receivers can be distinct hardware components embedded in the EGM. In one embodiment, the transducers and receivers can comprise the same hardware component capable of performing multiple functions.

Figure 1:
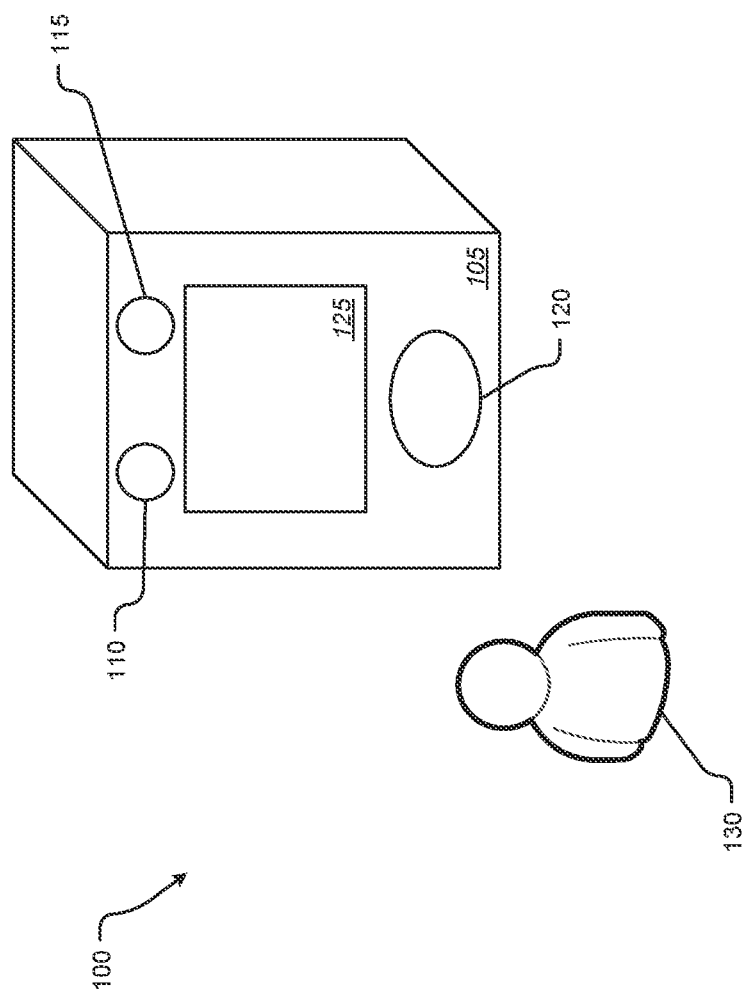
FIG. 1 is a block diagram illustrating an environment in which an Electronic Gaming Machine (EGM) according to embodiments disclosed herein may be implemented.

FIG. 1 is a block diagram illustrating an environment in which an Electronic Gaming Machine (EGM) according to embodiments disclosed herein may be implemented. As illustrated in this example, the environment 100 can comprise an Electronic Gaming Machine (EGM) 105 executing any of a variety of electronic games including but not limited to slots, video poker, video roulette, etc. The EGM 105 can comprise one or more ultrasonic transducers 110 producing directional, ultrasonic pulses and air haptic feedback to a predetermined location and one or more ultrasonic receivers 115 positioned on the EGM to receive a return of the ultrasonic pulses from the ultrasonic transducers 110 when a portion of a player's 130 body is at the predetermined location, e.g., in front of the EGM 105 at a normal sitting or standing location when playing the game. As noted above, the transducers 110 and receivers 115 can be distinct hardware components or can comprise the same hardware component capable of performing multiple functions. The EGM 105 can further comprise a directional speaker 120 producing a directional, audio signal and a display 125 outputting images, graphics, animations, video, etc. while the electronic game is being executed.

Generally speaking, the ultrasonic transducers 110 of the EGM 105 can output the directional, ultrasonic pulses to a predetermined location and the ultrasonic receivers 115 can receive a return our bounced signal. A presence and/or movement of a player 130 in front of or near the EGM 105, i.e., at the predetermined location, can be detected based on the received signal from the ultrasonic receiver. For example, detecting the movement of the player 130 can comprise detecting the player 130 arriving at the predetermined location, e.g., sitting down at the EGM 105. In response to the player 130 arriving at the EGM 105, the EGM 105 may transition from the idle state to an active state. Transitioning to an active state can comprise, for example displaying a welcome screen on the display 125 that guides the player 130 through game play on the EGM 105. In other cases, detecting the movement of the player 130 can comprise detecting the player 130 leaving the EGM 105. In response to the player 130 leaving the predetermined location, the EGM 105 can transition 335 to an idle state.

If the player 130 is not arriving at or leaving the EGM 105, the player 130 can be moving about at or near the predetermined location. In other words, detecting the movement of the player 130 can comprise detecting a relocation of the player 130 during game play of an electronic game executed by the EGM 105. Accordingly, the directional speaker 120 can be dynamically adjusted to output sound to a location associated with the relocation of the player 130, i.e., to a location associated with the detected movement of the player 130. Additionally, or alternatively, the detected movement of the player 130 can comprise a gesture input to the EGM 105, e.g., a hand gesture in the air to indicate an input to the EGM 105. Accordingly, the ultrasonic transducers 110 and/or directional speaker 120 can be controlled to output an air haptic feedback based on the gesture input and to a location associated with the detected movement of the player 130.

Figure 2:
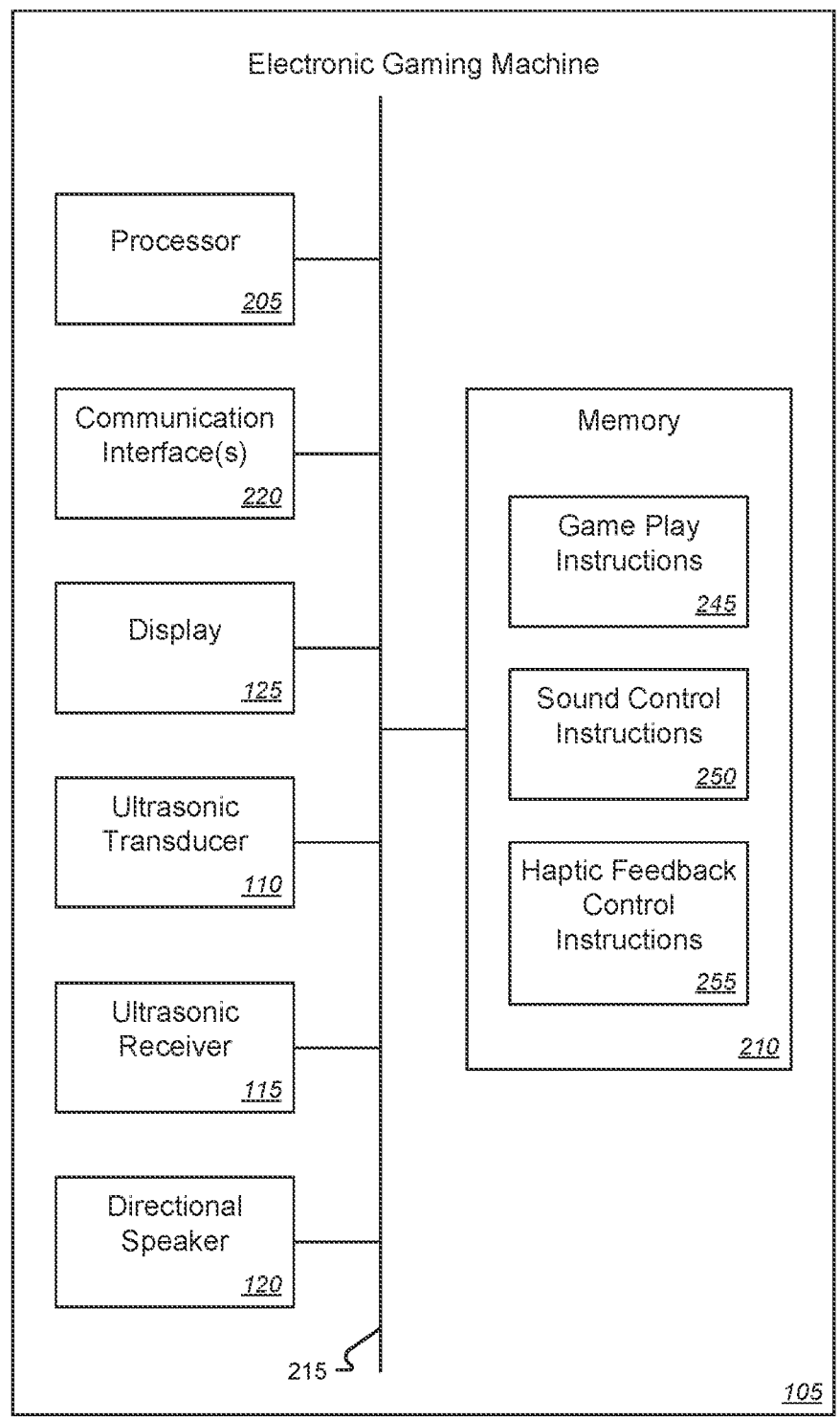
FIG. 2 is a block diagram illustrating additional details of an EGM according to one embodiment of the present disclosure.

FIG. 2 is a block diagram illustrating additional details of an EGM according to one embodiment of the present disclosure. As illustrated in this example, an EGM 105 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the mobile device 110 as described herein.

A memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communication interfaces 220 and a display 225 via the communications bus 215. The communication interfaces 220 can comprise, for example, Ethernet, Bluetooth, WiFi, or other type of wired or wireless communications interfaces. The display 225 can comprise, for example, a Liquid Crystal Display (LCD), Light Emitting Diode (LED), Organic Light Emitting Diode (OLED), or other type of display.

The EGM 105 can further comprise an ultrasonic transducer 110 and an ultrasonic receiver 115 coupled with the communications bus 215. The ultrasonic transducer 110 can produce directional, ultrasonic pulses and air haptic feedback to a predetermined location while the ultrasonic receiver 115 can be positioned on the EGM 105 to receive a return of the ultrasonic pulses from the ultrasonic transducer when a portion of a player's body is at the predetermined location. The EGM 105 can also include a directional speaker 120 also coupled with the communications bus 215 and producing a directional, audio signal.

The memory 210 can store therein sets of instructions which, when executed by the processor 205, cause the processor 205 to control directional sound and air haptic feedback during execution of an electronic game. More specifically, the memory 210 can have stored therein a set of Game play instructions 245 which, when executed by the processor 205, cause the processor 205 to conduct any of a variety of electronic games such as those mentioned above. The memory 210 can also store a set of sound control instructions 250 and haptic feedback control instructions 255. Together, and individually, the sound control instructions 250 and haptic feedback control instructions 255, when executed by the processor 205, can cause the processor 205 to control the ultrasonic transducer 230, ultrasonic receiver 115, and directional speaker 120 to detect movement of a player 130 of the EGM 105 and control sound and air haptic feedback based on that movement.

More specifically, sound control instructions 250 and haptic feedback control instructions 255 can cause the processor to control the ultrasonic transducer 110 of the EGM 105 to output the directional, ultrasonic pulses to a predetermined location and receive a signal from the ultrasonic receiver 115, the signal based on a return of the ultrasonic pulses. The sound control instructions 250 and haptic feedback control instructions 255A can cause the processor 205 to detect a movement of a player 130 in front of or near the EGM 105, i.e., at the predetermined location, based on the received signal from the ultrasonic receiver 115.

For example, detecting the movement of the player 130 can comprise detecting the player 130 arriving at the predetermined location while the EGM 105 is in an idle state. Accordingly, the sound control instructions 250 and haptic feedback control instructions 255 can cause the processor 205 to make a determination, based on the signal received from the ultrasonic receiver 115, as to whether the player 130 is arriving at the EGM 105. In response to determining the player 130 is arriving at the EGM 105, the sound control instructions 250 and haptic feedback control instructions 255 can cause the processor 205 to transition the EGM 105 from the idle state to an active state. For example, transitioning from an idle state to an active state can comprise displaying, on the display device, a welcome screen that guides the player 130 through game play on the EGM 105.

In other cases, detecting the movement of the player 130 can comprise detecting the player 130 leaving the EGM 105. Accordingly, the sound control instructions 250 and haptic feedback control instructions 255 can cause the processor 205 to make a determination as to whether the player 130 is leaving the predetermined location. In response to determining 330 that the player 130 leaving the predetermined location, the sound control instructions 250 and haptic feedback control instructions 255 can cause the processor 205 to transition the EGM 105 to an idle state.

If the player 130 is not arriving at or leaving the EGM 105, the player 130 can be moving about at or near the predetermined location. In other words, detecting the movement of the player 130 can comprise detecting a relocation of the player 130 during game play of an electronic game executed by the EGM 105. Accordingly, the sound control instructions 250 and haptic feedback control instructions 255 can cause the processor 205 to control of the directional speaker 120 to output sound to a location associated with the relocation of the player 130, i.e., to a location associated with the detected movement of the player 130. Additionally, or alternatively, the detected movement of the player 130 can comprise a gesture input to the EGM 105, e.g., a hand gesture in the air to indicate an input to the EGM 105. Accordingly, the sound control instructions 250 and haptic feedback control instructions 255 can cause the processor 205 to control the ultrasonic transducer and/or the directional speaker 120 to output the air haptic feedback based on the gesture input and to a location associated with the detected movement of the player 130.

Figure 3:
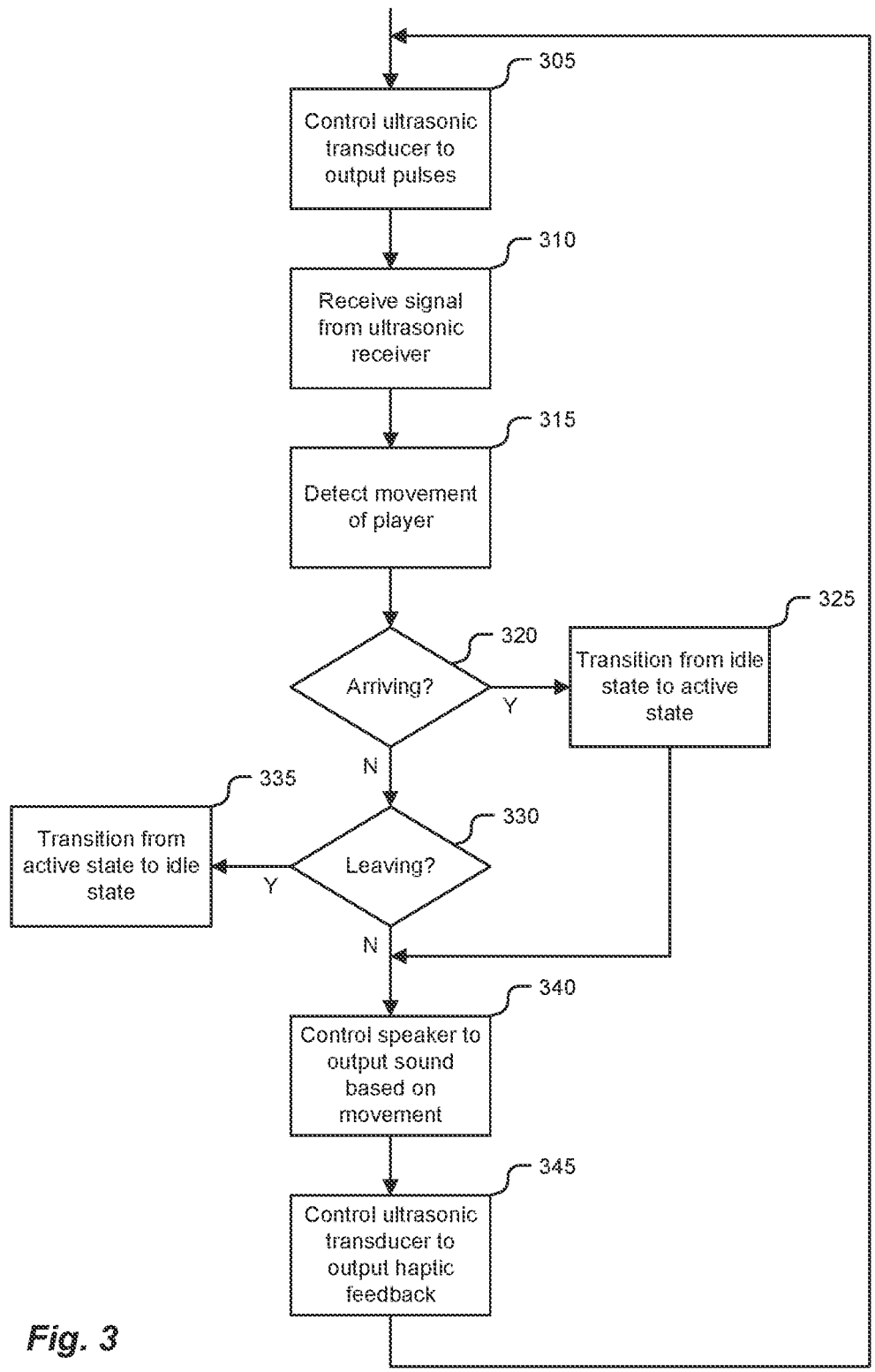
FIG. 3 is a flowchart illustrating an exemplary process for controlling directional sound and air haptic feedback using ultrasonic transducers and receivers according to one embodiment of the present disclosure.

FIG. 3 is a flowchart illustrating an exemplary process for controlling directional sound and air haptic feedback using ultrasonic transducers and receivers according to one embodiment of the present disclosure. As illustrated in this example, controlling directional sound and air haptic feedback can begin with controlling 305 the ultrasonic transducer 110 of the EGM 105 to output the directional, ultrasonic pulses to a predetermined location and receiving 310 a signal from the ultrasonic receiver, the signal based on a return of the ultrasonic pulses. A movement of a player 130 in front of or near the EGM 105, i.e., at the predetermined location, can be detected 315 based on the received signal from the ultrasonic receiver.

For example, detecting 315 the movement of the player 130 can comprise detecting the player 130 arriving at the predetermined location while the EGM is in an idle state. Accordingly, a determination 320 can be made, based on the signal received from the ultrasonic receiver, as to whether the player 130 is arriving at the EGM 105. In response to determining 320 the player 130 is arriving at the EGM 105, the EGM 105 can transition 325 from the idle state to an active state. For example, transitioning 325 from an idle state to an active state can comprise displaying, on the display device, a welcome screen that guides the player 130 through game play on the EGM.

In other cases, detecting 315 the movement of the player 130 can comprise detecting the player 130 leaving the EGM 105. Accordingly, a determination 330 can be made as to whether the player 130 is leaving the predetermined location. In response to determining 330 that the player 130 leaving the predetermined location, the EGM 105 can transition 335 to an idle state.

If the player 130 is not arriving at or leaving the EGM 105, the player 130 can be moving about at or near the predetermined location. In other words, detecting the movement of the player 130 can comprise detecting a relocation of the player 130 during game play of an electronic game executed by the EGM 105. Accordingly, control of the directional speaker can be dynamically adjusted 340 to output sound to a location associated with the relocation of the player 130, i.e., to a location associated with the detected movement of the player 130. Additionally, or alternatively, the detected movement of the player 130 can comprise a gesture input to the EGM 105, e.g., a hand gesture in the air to indicate an input to the EGM 105. Accordingly, the ultrasonic transducer can be controlled 345 to output the air haptic feedback based on the gesture input and to a location associated with the detected movement of the player 130.

Figure 4:
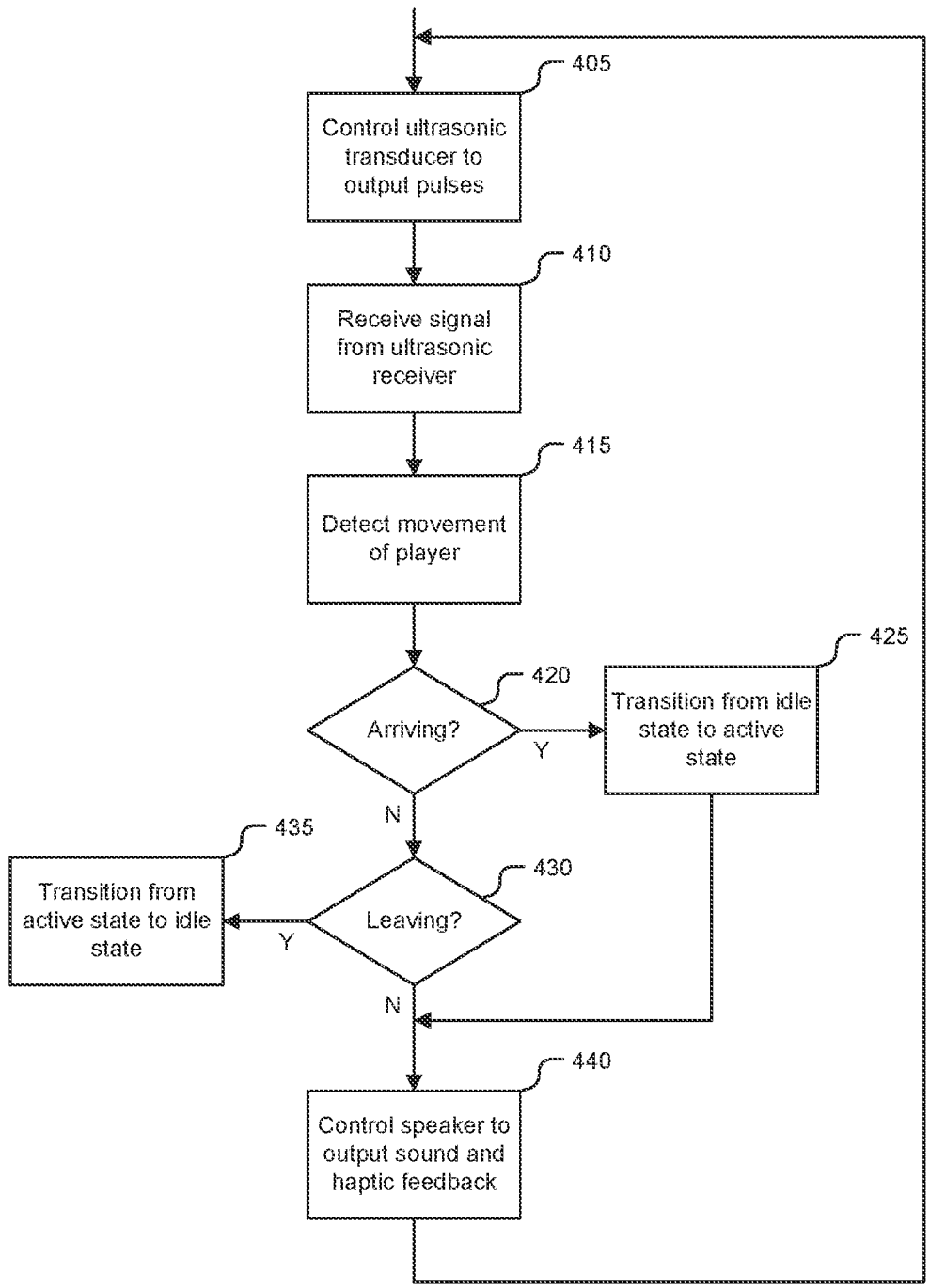
FIG. 4 is a flowchart illustrating an exemplary process for controlling directional sound and air haptic feedback using ultrasonic transducers and receivers according to another embodiment of the present disclosure.

FIG. 4 is a flowchart illustrating an exemplary process for controlling directional sound and air haptic feedback using ultrasonic transducers and receivers according to another embodiment of the present disclosure. As illustrated in this example, controlling directional sound and air haptic feedback can begin with controlling 405 the ultrasonic transducer 110 of the EGM 105 to output the directional, ultrasonic pulses to a predetermined location and receiving 410 a signal from the ultrasonic receiver, the signal based on a return of the ultrasonic pulses. A movement of a player 130 in front of or near the EGM 105, i.e., at the predetermined location, can be detected 415 based on the received signal from the ultrasonic receiver.

For example, detecting 415 the movement of the player 130 can comprise detecting the player 130 arriving at the predetermined location while the EGM is in an idle state. Accordingly, a determination 420 can be made, based on the signal received from the ultrasonic receiver, as to whether the player 130 is arriving at the EGM 105. In response to determining 420 the player 130 is arriving at the EGM 105, the EGM 105 can transition 425 from the idle state to an active state. For example, transitioning 425 from an idle state to an active state can comprise displaying, on the display device, a welcome screen that guides the player 130 through game play on the EGM.

In other cases, detecting 415 the movement of the player 130 can comprise detecting the player 130 leaving the EGM 105. Accordingly, a determination 430 can be made as to whether the player 130 is leaving the predetermined location. In response to determining 430 that the player 130 leaving the predetermined location, the EGM 105 can transition 435 to an idle state.

If the player 130 is not arriving at or leaving the EGM 105, the player 130 can be moving about at or near the predetermined location. In other words, detecting the movement of the player 130 can comprise detecting a relocation of the player 130 during game play of an electronic game executed by the EGM 105. Additionally, or alternatively, the detected movement of the player 130 can comprise a gesture input to the EGM 105, e.g., a hand gesture in the air to indicate an input to the EGM 105. In either case, control of the directional speaker can be dynamically adjusted 440 to output sound and/or air haptic feedback to a location associated with the relocation of the player 130.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The invention is claimed as follows:

1. An Electronic Gaming Machine (EGM) comprising:
   an ultrasonic transducer producing directional, ultrasonic pulses and a first directional air haptic feedback to a predetermined location for playing an electronic game on the EGM;
   an ultrasonic receiver positioned on the EGM to receive a return of the ultrasonic pulses from the ultrasonic transducer when a portion of a player's body is at the predetermined location;
   a directional speaker producing a directional, audio signal and a second directional air haptic feedback;
   a processor coupled with each of the ultrasonic transducer, the ultrasonic receiver, and the directional speaker; and
   a memory coupled with and readable by the processor and storing therein a set of instructions which, when executed by the processor, cause the processor to:
      control the ultrasonic transducer to output the directional, ultrasonic pulses to the predetermined location;
      receive a signal from the ultrasonic receiver;
      detect a presence of the player at the predetermined location based on the received signal;
      control a state of the EGM based on the detected presence of the player at the predetermined location;
      detect a movement of the player based on the received signal from the ultrasonic receiver;
      determine whether the detected movement of the player is a relocation of the player or a gesture input by the player, wherein the relocation of the player comprises a change in location of the player while still within the predetermined location;
      control the ultrasonic transducer to output the first directional air haptic feedback to the location associated with the detected movement of the player and based on whether the detected movement of the player is determined to be a relocation of the player or a gesture input by the player; and
      control the directional speaker to output sound and the second directional air haptic feedback to a location associated with the detected movement of the player and based on whether the detected movement of the player is determined to be a relocation of the player or a gesture input by the player.

2. The EGM of claim 1, wherein detecting the presence of the player comprises detecting the player at the predetermined location while the EGM is in an idle state.

3. The EGM of claim 2, wherein controlling the state of the EGM comprises transitioning the EGM from the idle state to an active state in response to detecting the player at the predetermined location.

4. The EGM of claim 3, further comprising a display device and wherein transitioning to the active state comprises displaying, on the display device, a welcome screen that guides the player through game play on the EGM.

5. The EGM of claim 1, wherein the movement of the player comprises a relocation of the player during game play of an electronic game executed by the EGM.

6. The EGM of claim 5, wherein the instructions further cause the processor to dynamically adjust control of the directional speaker to output sound to a location associated with the relocation of the player.

7. The EGM of claim 1, wherein the detected movement of the player comprises a gesture input to the EGM, and wherein the instructions further cause the processor to control the ultrasonic transducer to output the first air haptic feedback based on the gesture input.

8. The EGM of claim 1, wherein the detected movement of the player comprises a gesture input to the EGM.

9. The EGM of claim 1, wherein detecting the presence of the player comprises detecting the player being no longer present at the predetermined location and wherein controlling the state of the EGM based on the detected presence of the player comprises, in response to detecting the player leaving the predetermined location, to transition to an idle state.

10. An Electronic Gaming Machine (EGM) comprising:
an ultrasonic transducer producing directional, ultrasonic pulses to a predetermined location for playing an electronic game on the EGM;
an ultrasonic receiver positioned on the EGM to receive a return of the ultrasonic pulses from the ultrasonic transducers when a portion of a player's body is at the predetermined location;
a directional speaker producing a directional, audio signal and a directional air haptic feedback to the predetermined location;
a processor coupled with each of the ultrasonic transducer, the ultrasonic receiver, and the directional speaker; and
a memory coupled with and readable by the processor and storing therein a set of instructions which, when executed by the processor, cause the processor to:
control the ultrasonic transducer to output the directional, ultrasonic pulses to the predetermined location;
receive a signal from the ultrasonic receiver;
detect a movement of the player based on the received signal from the ultrasonic receiver;
determine whether the detected movement of the player is a relocation of the player or a gesture input by the player, wherein the relocation of the player comprises a change in location of the player while still within the predetermined location; and
control the directional speaker to output the directional sound and the directional air haptic feedback to the location associated with the detected movement of the player and based on whether the detected movement of the player is determined to be a relocation of the player or a gesture input by the player.

11. The EGM of claim 10, wherein the movement of the player comprises a relocation of the player during game play of an electronic game executed by the EGM.

12. The EGM of claim 11, wherein the instructions further cause the processor to dynamically adjust control of the directional speaker to output the directional sound and the directional air haptic feedback to a location associated with the relocation of the player.

13. The EGM of claim 10, wherein the detected movement of the player comprises a gesture input to the EGM, and wherein the instructions further cause the processor to control the directional speaker to output the directional air haptic feedback based on the gesture input.

14. The EGM of claim 10, wherein detecting the movement of the player comprises detecting the player arriving at the predetermined location while the EGM is in an idle state and wherein the instructions further cause the processor to transition the EGM from the idle state to an active state in response to detecting the player arriving at the predetermined location.

15. A method for controlling directional sound and air haptic feedback in an Electronic Gaming Machine (EGM), the method comprising:
controlling, by a processor of the EGM, an ultrasonic transducer to output directional, ultrasonic pulses to a predetermined location for playing an electronic game on the EGM;
receiving, by the processor of the EGM, a signal from an ultrasonic receiver positioned to receive a return of the ultrasonic pulses from the ultrasonic transducer when a portion of a player's body is at a predetermined location relative to the EGM;
detecting, by the processor of the EGM, a movement of the player based on the received signal from the ultrasonic receiver;
determining, by the processor of the EGM, whether the detected movement of the player is a relocation of the player or a gesture input by the player, wherein the relocation of the player comprises a change in location of the player while still within the predetermined location;
controlling, by the processor of the EGM, a directional speaker to output a directional sound and a first directional air haptic feedback to a location associated with the detected movement of the player and based on whether the detected movement of the player is determined to be a relocation of the player or a gesture input by the player; and
controlling, by the processor of the EGM, the ultrasonic transducer to output a second directional air haptic feedback to the location associated with the detected movement of the player and based on whether the detected movement of the player is determined to be a relocation of the player or a gesture input by the player.

16. The method of claim 15, wherein detecting the movement of the player comprises detecting the player arriving at the predetermined location while the EGM is in an idle state.

17. The method of claim 16, further comprising transitioning, by the processor of the EGM, from the idle state to an active state in response to detecting the player arriving at the predetermined location.

18. The method of claim 15, wherein the movement of the player comprises a relocation of the player during game play of an electronic game executed by the EGM.

19. The method of claim 15, wherein the detected movement of the player comprises a gesture input to the EGM.

20. The EGM of claim 15, further comprising:
detecting, by the processor of the EGM, movement of the player away from the EGM based on the received signal from the ultrasonic receiver; and in response to detecting the player leaving the predetermined location, transitioning, by the processor of the EGM, to an idle state.

\* \* \* \* \*